United States Patent
Lindner-Silwester et al.

(10) Patent No.: US 9,027,934 B2
(45) Date of Patent: May 12, 2015

(54) SEALING ARRANGEMENT FOR SEALING A PISTON ROD OF A RECIPROCATING COMPRESSOR

(75) Inventors: Tino Lindner-Silwester, Vienna (AT);
Christian Hold, Bisamberg (AT);
Andreas Brandl, Vienna (AT);
Christian Kernbichler, Enzersdorf an der Fischa (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 0 days.

(21) Appl. No.: 13/138,140

(22) PCT Filed: Jan. 11, 2010

(86) PCT No.: PCT/EP2010/050216
§ 371 (c)(1),
(2), (4) Date: Aug. 18, 2011

(87) PCT Pub. No.: WO2010/079227
PCT Pub. Date: Jul. 15, 2010

(65) Prior Publication Data
US 2011/0298183 A1 Dec. 8, 2011

(30) Foreign Application Priority Data
Jan. 12, 2009 (AT) .................................. A 39/2009

(51) Int. Cl.
*F16J 15/16* (2006.01)
*F16J 15/56* (2006.01)
(Continued)

(52) U.S. Cl.
CPC ........... *F16J 15/441* (2013.01); *F04B 39/0022* (2013.01); *F04B 53/143* (2013.01);
(Continued)

(58) Field of Classification Search
USPC .......................... 277/558, 589, 380, 381, 500
See application file for complete search history.

(56) References Cited

U.S. PATENT DOCUMENTS

| 2,191,265 A | * | 2/1940 | Wheeler | 277/546 |
| 2,714,028 A | * | 7/1955 | Lyddon | 277/546 |

(Continued)

FOREIGN PATENT DOCUMENTS

| DE | 1144873 | 3/1963 |
| DE | 4211192 | 10/1993 |

(Continued)

OTHER PUBLICATIONS

English Abstract of DE4211192.
(Continued)

*Primary Examiner* — Vishal Patel
*Assistant Examiner* — Stacy Warren
(74) *Attorney, Agent, or Firm* — Dykema Gossett PLLC

(57) ABSTRACT

Due to increasingly strict requirements and regulations, it is becoming more and more important for piston compressors to reduce the amount of leakage of operating medium through the seal of the piston rod. Conventional seals comprising packing rings and/or packing ring combinations always have a certain amount of leakage, both during operation and when at standstill, which is why they are not usable for certain applications, or the complexity involved in such a seal increases considerably. A further problem involving the seals of piston rods relates to transverse movements by piston rods during which the sealing action of the seal must be maintained. Proposed is, therefore, a sealing arrangement according to the principle of a sealing medium barrier providing that the sealing elements 8, 9 are arranged in radial direction at a distance relative to the radial end of the recess 10 that receives the sealing elements 8, 9.

31 Claims, 4 Drawing Sheets

(51) Int. Cl.
   *F16J 15/44* (2006.01)
   *F04B 39/00* (2006.01)
   *F04B 53/14* (2006.01)
   *F16J 15/00* (2006.01)
   *F16J 15/24* (2006.01)
   *F16J 15/40* (2006.01)

(52) U.S. Cl.
   CPC ............. *F04B53/144* (2013.01); *F16J 15/004* (2013.01); *F16J 15/008* (2013.01); *F16J 15/24* (2013.01); *F16J 15/40* (2013.01); *F16J 15/406* (2013.01); *F16J 15/56* (2013.01)

(56) References Cited

U.S. PATENT DOCUMENTS

| | | | | |
|---|---|---|---|---|
| 3,194,568 | A | | 7/1965 | Payne |
| 3,216,651 | A | * | 11/1965 | King et al. ............... 417/364 |
| 3,271,037 | A | * | 9/1966 | Hammond ............... 277/544 |
| 3,542,374 | A | * | 11/1970 | Neilson et al. ............... 277/584 |
| 3,544,118 | A | * | 12/1970 | Klein ............... 277/579 |
| 3,860,270 | A | * | 1/1975 | Arnold ............... 277/625 |
| 4,093,239 | A | * | 6/1978 | Sugahara ............... 277/514 |
| 4,206,928 | A | | 6/1980 | Asano |
| 4,222,575 | A | * | 9/1980 | Sekiguchi et al. ............... 277/558 |
| 4,350,349 | A | | 9/1982 | McTavish |
| 4,469,017 | A | | 9/1984 | Hanlon |
| 4,514,148 | A | | 4/1985 | Topinka |
| 5,209,495 | A | * | 5/1993 | Palmour ............... 277/500 |
| 5,772,216 | A | * | 6/1998 | Bredemeyer ............... 277/318 |
| 6,286,837 | B1 | * | 9/2001 | Humphrey ............... 277/435 |
| 6,439,578 | B1 | | 8/2002 | Radcliffe |
| 6,481,720 | B1 | * | 11/2002 | Yoshida et al. ............... 277/400 |
| 6,932,351 | B1 | * | 8/2005 | Mowll ............... 277/512 |
| 7,118,114 | B2 | | 10/2006 | Burdick et al. |
| 2008/0230998 | A1 | | 9/2008 | Adler et al. |
| 2011/0298183 | A1 | | 12/2011 | Lindner-Silwester et al. |

FOREIGN PATENT DOCUMENTS

| | | |
|---|---|---|
| DE | 4211192 A1 | 10/1993 |
| EP | 0209999 | 1/1987 |
| EP | 0173788 | 5/1990 |
| GB | 905650 | 9/1962 |
| JP | 58119664 | 8/1983 |
| JP | 6018664 | 1/1985 |
| JP | 60114373 | 8/1985 |
| JP | 60172058 | 11/1985 |
| JP | 6375668 | 5/1988 |
| JP | 63075668 | 5/1988 |
| JP | 10169788 | 6/1998 |

OTHER PUBLICATIONS

English Abstract of JP10169788.
English Abstract of DE 4211192A1.
English Abstract of JP 10169788.
English Abstract of JP 60018664.
English Abstract of DE 1144873.

* cited by examiner

SEALING ARRANGEMENT FOR SEALING A PISTON ROD OF A RECIPROCATING COMPRESSOR

BACKGROUND OF THE INVENTION

1. Field of the Invention

The subject-matter of the invention refers to a sealing arrangement for sealing a reciprocating piston rod of a reciprocating compressor having a first and second sealing elements, and wherein the sealing elements are arranged inside a recess of the sealing arrangement at an axial distance, and wherein the sealing elements are arranged respectively at an axial end of the recess and in contact with the piston rod, and wherein a feed line of a sealing medium is provided in the sealing arrangement that is connected with the recess.

2. The Prior Art

Conventional seals between a reciprocating piston rod, for example of a reciprocating compressor, and a stationary machine component for sealing a space that is under high pressure, for example the operating pressure inside the cylinder of the compressor, relative to a space under low pressure, for example atmospheric pressure in the crankcase of the compressor, are typically implemented as sealing packs. A sealing pack of this type comprises several packing rings and/or packing ring combinations that are axially arranged one after the other. Combinations of a radially cut and a tangentially cut packing ring are used most frequently, as set forth, for example, in EP 1 146 264 A2. Also used, in addition, are segmented ring designs in which a packing ring is composed of several ring segments, as known in the art, for example, from U.S. Pat. No. 4,350,349 A. But seals of this type are not completely (100%) leak-proof systems; they always have a certain amount of leakage escaping through the seal.

In certain applications involving compressors, for example compressor stations for the conveyance of natural gas, it is becoming increasingly important to minimize working medium leakages (for example, natural gas) for environmental reasons (not least of all because the requirements mandated by the legislatures are increasingly being tightened). Therefore, conventional sealing packs would have to meet high requirements; a proposition, however, that is, on the one hand, not always possible to implement and would, on the other hand, at least translate into a considerable increase of complexity in terms of providing sealing action.

The prior art describes seals for two components that are moved relative to each other, for example between a piston rod and a machine housing, operating according to the principle of a "fluid barrier." In this instance, a sealing medium (for example, oil and another suitable fluid) is supplied between two sealing elements under a higher pressure than ambient pressure, for example the operating pressure inside the cylinder of a compressor. This way, a working medium, for example a gas or air, having a lower pressure level than the pressure of the sealing medium cannot escape through the seal to the outside. An example for such a seal is disclosed, for example, in DE 28 39 243 A1 with oil as a sealing medium or in DE 10 2005 034 908 A1 with an ionic fluid as a sealing medium. Seals of this type are therefore also referred to as gas-proof seals and can be kept leak-proof even during a standstill as long as the pressure of the sealing medium is maintained. However, in these cases there usually occurs leaking of sealing medium, which must be captured correspondingly.

But reciprocating compressors, in particular, are able to execute significant transverse movements, aside from the stroke in axial direction by the piston rod. A seal of a piston rod on a reciprocating compressor must therefore be operable and provide secure sealing action even for such transverse movements.

SUMMARY OF THE INVENTION

The object of the present invention therefore consists in disclosing a leak-proof seal of a piston rod that works according to the principle of a sealing medium barrier and that is able to compensate for possible transverse movements by the piston rod while maintaining sealing action.

This object is achieved according to the invention by providing sealing elements that are arranged in radial direction at a distance relative to the radial end of the recess so that the sealing medium engages axially and on the radial outer circumference area of the first and second sealing elements. Due to the radial distance relative to the radial end of the recess, it is ensured that the sealing elements can move along and unobstructed (aside from any frictional forces) by any possible transverse movement by the piston rod and without losing sealing action.

In one advantageous and constructively simple embodiment the recesses in the sealing arrangement are constituted by two L-shaped chamber plates that are arranged axially adjacent to each other, and wherein a sealing element, respectively, is arranged in the recess that is constituted by the L-shaped chamber plate. Such L-shaped chamber plates can be assembled very easily, for example by continuous bolts, to form a compact sealing arrangement. Furthermore, in terms of construction it is advantageous for the two L-shaped chamber plates to be arranged in parallel so that the radial leg of an L-shaped chamber plate is arranged between the two sealing elements and the two sealing elements are arranged at an axial distance relative to this radial leg. In an embodiment of this type the feed line can easily be arranged in this center-radial leg.

Suitable sealing elements are rigid, segmented or cut packing rings or packing ring combinations or even hydraulic sealing rings. This allows for achieving high flexibility and the sealing arrangement can be optimally adjusted to the respective concrete application at hand as well as prevalent conditions.

When using a hydraulic sealing ring, said sealing ring is advantageously arranged in axial contact inside a rigid L-shaped support ring, and wherein the support ring remains at a radial distance relative to the radial end of the recess. In this context, it is possible to dispose an accessory sealing unit between the support ring and the hydraulic sealing ring. An apparatus of this kind is compact and provides secure sealing action for the main sealing area (here toward the piston rod) but also the accessory sealing areas.

When on a first axial end of the sealing arrangement, a third sealing element is arranged inside a third recess of the sealing arrangement that is implemented as a packing ring or packing ring combination, it is prevented, on the one hand, the penetration of dirt into the seal and still maintains, on the other hand, a certain sealing action should the adjacent sealing element fail, whereby it is possible to prevent at least any undesired, uninhibited escape of sealing medium. This increases the operational dependability of the sealing arrangement.

It is especially advantageous if a feed line opens into an intermediate space constituted between the first sealing element and the third sealing element that is connected during operational use with the suction pressure of the piston compressor, whereby the suction pressure is in effect in this intermediate space. This way, this intermediate space is held at suction pressure, and the first sealing element must now only provide sealing action against the (low) constant suction pressure. The (high) dynamic operating pressure is reduced therein by the third sealing element. This simplifies the constructive configuration of the sealing arrangement and reduces the requirements relative to the first sealing element considerably, especially with regard to the required operating life. In addition, this advantageously allows for the possibility of considerably reducing the operating pressure of the sealing medium, which means all involved systems can be operated at lower pressures.

The pressure difference that is active on the second sealing element can be lowered if a fifth sealing element is arranged at a second axial end of the sealing arrangement in a further fifth recess of the sealing arrangement adjacent to the second sealing element that is implemented as a packing ring or packing ring combination or as a hydraulic sealing ring, because in that instance the pressure difference is divided between the second and fifth sealing elements. This measure reduces the requirements placed upon the second sealing element, primarily regarding the required operating life. Moreover, the operational dependability of the sealing arrangement is increased since the fifth sealing element will still maintain a certain sealing action if the second sealing element should fail.

To prevent any leakage of sealing medium it is possible to dispose a seventh sealing element at a second axial end of the sealing arrangement that is implemented as a scraper ring. Any sealing medium still adhering to the piston rod is thus scraped off and can be recirculated in the sealing medium circulation.

The operational dependability can also be improved by disposing between the first sealing element and the second element in a further sixth recess of the sealing arrangement a further sixth sealing element that is implemented as a packing ring or packing ring combination or as a hydraulic seal and that is arranged during operational use at a radial distance relative to the piston rod. During normal operation such a sealing element is ineffective, but it is activated if the first sealing element should fail because in that case the pressure that is to be sealed against acts upon the sixth sealing element.

The seventh sealing element that acts as a scraper ring can be easily maintained without differential pressure if the pressure that acts before the scraper ring is connected to the seventh recess.

BRIEF DESCRIPTION OF THE DRAWINGS

The invention will be better understood by reference to the attached FIGS. 1 to 6 wherein.

DETAILED DESCRIPTION OF THE PREFERRED EMBODIMENTS

Figure 1:
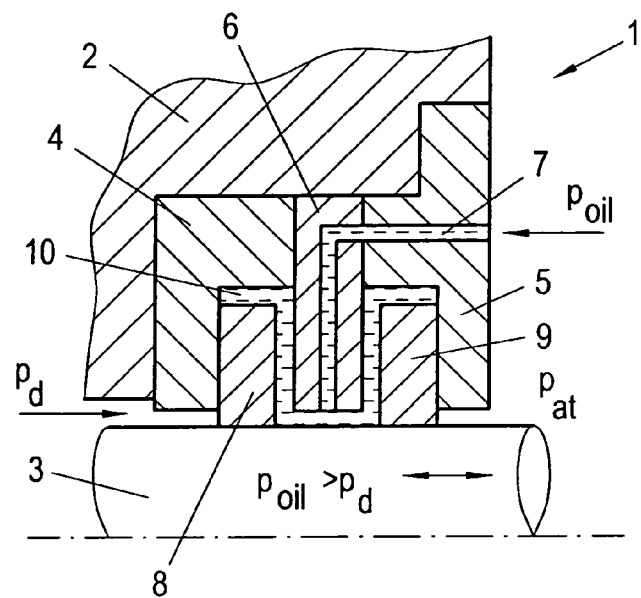
FIG. 1 shows a gas-proof seal according to an embodiment of the invention.

FIG. 1 shows a sealing arrangement 1 according to the invention for sealing an axially reciprocating piston rod 3 of a reciprocating compressor against a pressure $p_d$ of a working medium for which sealing action is required, for example cylinder pressure. The sealing arrangement 1 is arranged inside a stationary housing component 2 of the compressor and provides sealing action between this housing component 2 and the moving piston rod 3.

The sealing arrangement 1 comprises in the shown example two L-shaped chamber plates 4, 5 that are axially partitioned in the shown embodiment by a separator plate 6. The L-shaped chamber plates 4, 5 and the separator plate 6 are arranged axially contacting each other and at a radial distance relative to the piston rod 3 in order to prevent inadvertent contact by the piston rod 3 with the chamber plates 4, 5 and to allow for the capacity by piston rod to move freely in a transverse direction relative to the stroke (indicated by the double arrow). In the simplest scenarios it is possible to omit the separator plate 6. But other implementations are also conceivable, for example with T-shaped separator plates. It is also possible to provide a flange radially outside on a chamber plate 5 by which the sealing arrangement 1 can be fastened to the housing component 2. The chamber plates 4, 5 and, if necessary, the separator plate 6, can be held together in a known fashion by a continuous bolt. A recess 10 is created between the L-shaped chamber plates 4, 5, if necessary, the separator plate 6 and the piston rod 3 by this arrangement. A first and a second sealing element 8, 9 are arranged inside this recess 10, and wherein, due to the pressure of a sealing medium that is supplied to the recess 10 respectively at the axial ends of the recess 10, meaning the radial legs of the L-shaped chamber plates 4, 5, the sealing elements 8, 9 are in contact with the former and axially separated from each other (the orientations "axial" and "radial" relate to the orientation of the piston rod 3). The first and second sealing elements 8, 9 are arranged at a radial outside distance relative to the chamber plates 4, 5, meaning relative to the axial legs of the chamber plates 4, 5 and are in radial inside contact with the sealing area on the piston rod 3. The sealing elements 8, 9 are therefore freely movable with the piston rod 3 in transverse direction relative to the stroke (aside from any frictional forces between sealing elements 8, 9 and chamber plates 4, 5). In addition, a feed line 7 is provided in the sealing arrangement 1 that is connected with the recess 10 and by which a sealing medium, for example an oil, is added at a pressure $p_{oil}$, that is higher than the pressure $p_d$, against which sealing action is to be provided, and can be supplied in recess 10. In the case of a dynamically changing working pressure $p_d$, naturally $p_{oil} > p_{d,max}$ must apply, or the pressure of the sealing medium is dynamically adjusted to the pressure of the working medium, always resulting in $p_{oil} > p_d$. Thus, the sealing medium is enclosed in the recess 10 by the sealing elements 8, 9 and acts radially outside and axially relative to the sealing elements 8, 9, which are thereby pressed radially to the inside against the piston rod 3 and axially against the chamber plates 4, 5, thereby providing sealing action. This creates a sealing medium barrier preventing any leakage of the gaseous working medium of the compressor for which sealing action is to be provided. With any transverse movement by the piston rod 3 relative to the stroke, the sealing elements 8, 9 are moved along without impairing the sealing action.

Possible for use as sealing elements 8, 9 are either known hydraulic sealing rings, for example a lip-shaped gasket or a compact sealing ring, with a sealing lip that is in contact with the piston rod 3 or, however, commonly known rigid, cut or segmented packing rings or packing ring combinations, for example a combination comprised of a radially and a tangentially cut packing ring. As is generally known, hydraulic sealing rings can also be implemented in such a way that the sealing medium that is pressed through the lip of the gasket during a stroke is "return-suctioned" during the counter-stroke, meaning that in total no leakage of sealing medium through the hydraulic sealing ring occurs. If packing rings or packing ring combinations are used, usually a minimal amount of leakage of sealing medium occurs through the seal;

but usually this does not present a problem. With packing rings, there is usually also leaking at standstill while a hydraulic sealing ring also seals by way of sealing medium pressure during a standstill, at least for as long as the sealing medium pressure is maintained.

Figure 2:
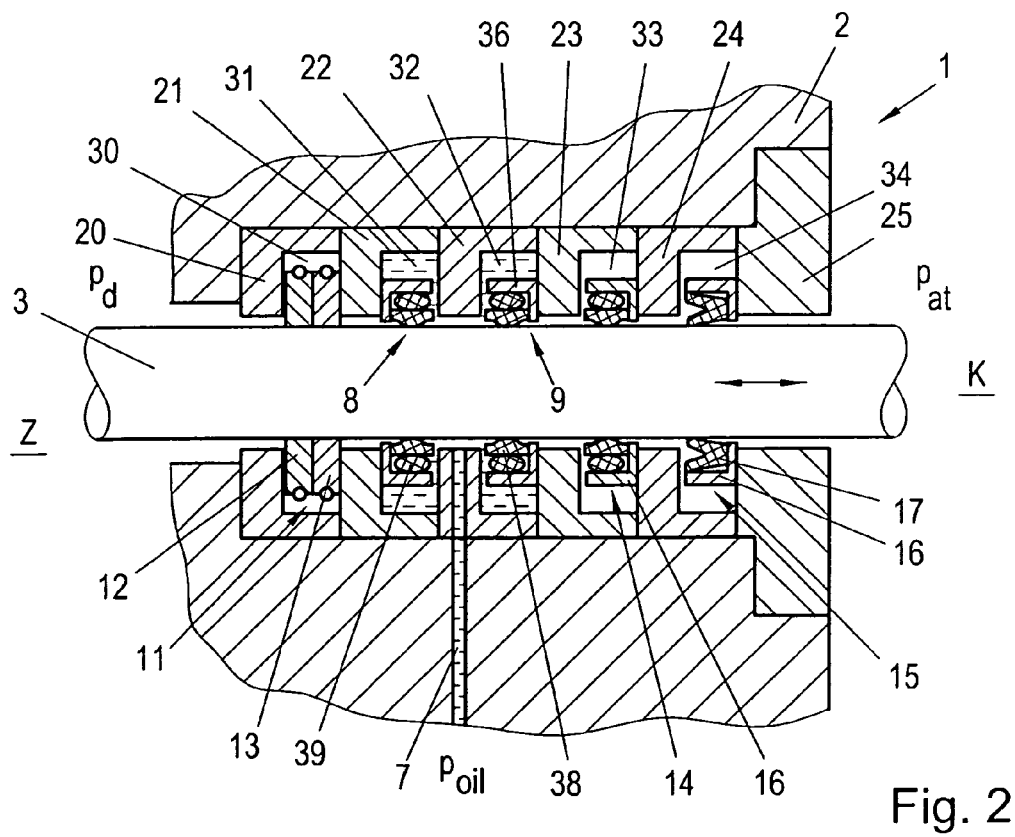
FIGS. 2 to 6 show further advantageous embodiments of the inventive gas-proof seal.

FIG. 2 shows a further advantageous embodiment of the sealing arrangement according to the invention 1. The sealing arrangement 1 comprises in this instance several L-shaped chamber plates 20, 21, 22, 23, 24 arranged in series, one after the other, and wherein the L-shaped chamber plates 20, 21, 22, 23, 24 here are all aligned in parallel, which is why the axial legs all point in the same direction. But other configurations are also conceivable, for example including T-shaped separator plates. At the end K on the side of the crank case this sealing arrangement 1 is completed in axial direction by an end plate 25 that is implemented as a flange to be fastened in the housing component 2. The chamber plates 20, 21, 22, 23, 24 and the end plate 25 in turn are arranged at a radial distance relative to the piston rod 3. This creates recesses 30, 31, 32, 33, 34 between an L-shaped chamber plate 20, 21, 22, 23, 24 and the radial leg of the adjacent chamber plate 20, 21, 22, 23, 24 and/or the end plate 25, and it is now possible to dispose sealing elements having different functions therein that are arranged at axial distances relative to each other. But the individual sealing elements are in total arranged at radial distances relative to the respective ends of the recesses 30, 31, 32, 33, 34 in order for the piston rod 3 to preserve its ability for transverse movement relative to the stroke.

Figure 3:
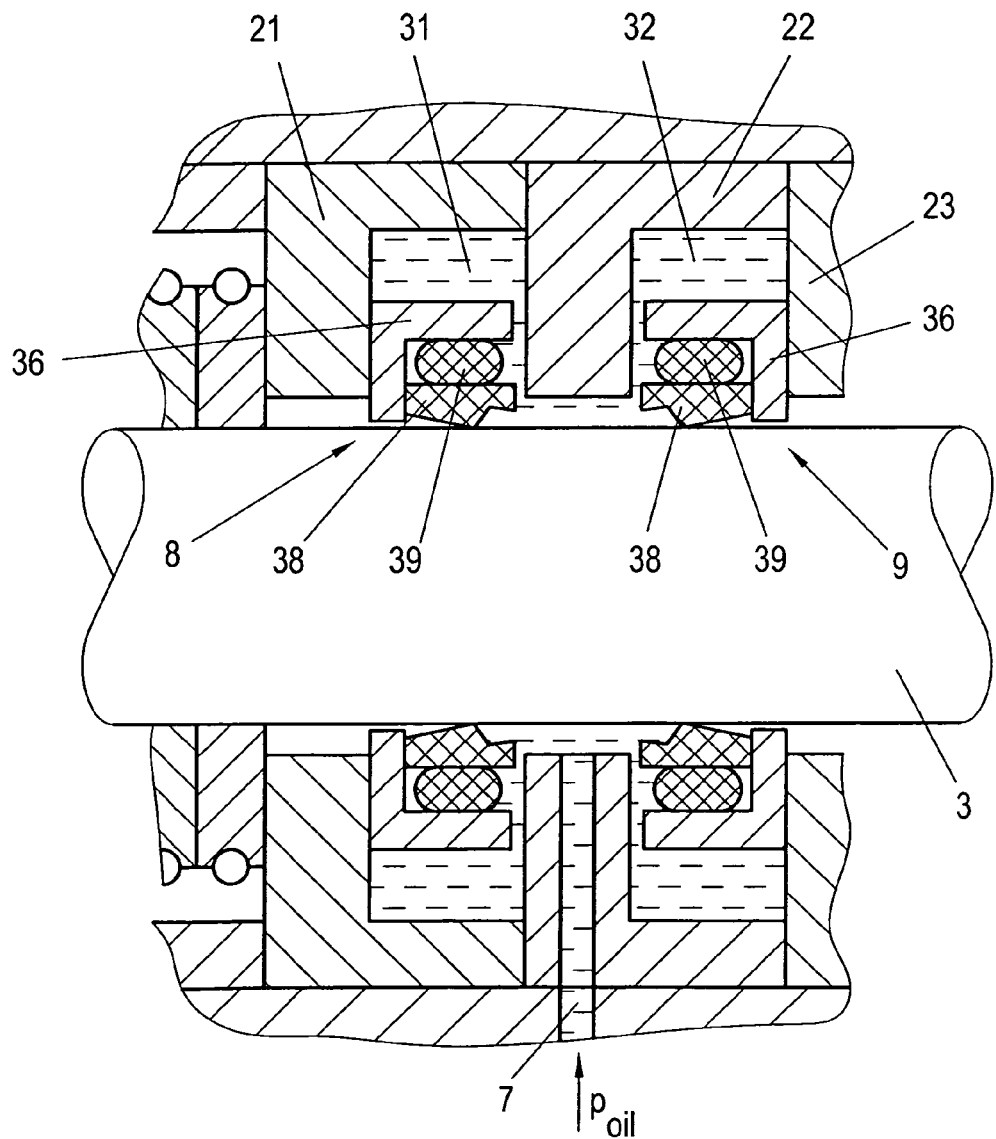

The actual sealing action is achieved by the sealing elements 8, 9 that are arranged inside the recesses 31, 32 which are constituted by the three adjacent chamber plates 21, 22, 23, as described above regarding FIG. 1. The feed line 7 for the sealing medium can be routed through the radial leg of an L-shaped chamber plate 22. A sealing element 8, 9, as shown in detail in FIG. 3, comprises in the present instance, respectively, one L-shaped rigid support ring 36 that is in contact with the radial leg of the axial outer chamber plates 21, 23 and that is arranged at a radial distance relative to the axial leg of the axial outer chamber plates 21, 23. A hydraulic sealing ring 38 is in axial contact with the radial leg of the support ring 36. Furthermore, it is possible to dispose an elastic accessory sealing unit 39, for example an O-ring, between the axial leg of the support ring 36 and the hydraulic sealing ring 38. This accessory sealing unit 39 serves for sealing the accessory sealing areas, presently, for example, between the radial leg of the support ring 36 and the hydraulic sealing ring 38, but also for pressing the hydraulic sealing ring 38 against the sealing area of the piston rod 3. The use of an O-ring as accessory sealing unit 39 is especially advantageous because an elastic, non-compressible O-ring converts the applied sealing medium pressure into a radial press-on force by which the sealing ring 38 is pressed against the piston rod 3. But it is also possible to omit this accessory sealing unit 39; in that case the hydraulic sealing ring 38 would also be in contact with the axial leg of the support ring 36 and provide sealing action for these accessory sealing areas.

The L-shaped support ring 36, if necessary the accessory sealing unit 39 and the hydraulic sealing ring 38, are at an axial distance relative to the center-radial leg of the chamber plate 22 so that the sealing medium is able to press the sealing element 8, 9 for achieving sealing action against the respective radial leg of the chamber plates 21, 23. If the piston rod performs a radial movement, the sealing element 8, 9, presently the apparatus comprised of the L-shaped support ring 36, if necessary the elastic support ring 39, and the hydraulic sealing ring, is moved along with the piston rod 3 while maintaining the sealing action.

At the cylinder-side end Z of the sealing arrangement 1 a third sealing element 11 is arranged before the sealing element 8, 9 and at an axial distance thereto inside the recess 30 of the L-shaped chamber plate 20, here a combination comprised of a radially cut 12 and tangentially cut packing ring 13. But the third sealing element 11 can also be implemented as a rigid or segmented packing ring or as a packing ring combination. During operational use of the sealing arrangement 1 the high working pressure $p_d$ of the working medium thus acts upon this third sealing element 11. This third sealing element 11 serves substantially, on the one hand, to prevent any dirt from penetrating the actual seal and through the two sealing elements 8, 9 and, on the other hand, to preserve the ability for maintaining a certain sealing effect in the event that sealing element 8 should fail, which is provided by the third sealing element 11 and can prevent at least the uninhibited escape of sealing medium into the cylinder chamber.

A fourth sealing element 14 is arranged at the end K on the crankcase side after the sealing elements 8, 9 inside the recess 33 of the L-shaped chamber plate 23, presently again a combination comprising an L-shaped support ring, if necessary accessory sealing unit and hydraulic sealing ring, as described above. This fourth sealing element 14 provides, on the one hand, a distribution of the effective pressure difference between pressure $P_{oil}$ of the sealing medium and the atmospheric pressure $P_{at}$ acting inside the crankcase upon the sealing elements 9 and 14; on the other hand, this sealing element 14 provides a certain security in the event that sealing element 9 should fail. But instead of a hydraulic sealing ring, possible options for use as a sealing element 14 are a rigid, cut or segmented packing ring and/or a packing ring combination of such packing rings.

Moreover, the sealing arrangement 1 can be completed at the end K on the crankcase side by a fifth sealing element 15, here a scraper ring 17, that is arranged inside a recess 34 of the last L-shaped chamber plate 24. The scraper ring 17 that is without differential pressure is arranged therein inside an L-shaped support ring 16 and can also be axially pressed against the support ring 16 by springs or another preload in order to prevent any axial back and forth movement by the scraper ring 17. The scraper ring 17 removes excess sealing medium adhering to the piston rod 3 from said piston rod 3. This excess sealing medium can be collected in the recess 34 and discharged from there via the corresponding discharge lines and routed to a sealing medium reservoir. In addition, the fifth sealing element 15 prevents any penetration of dirt into the actual seal that is constituted by the two sealing elements 8, 9 and, if necessary, sealing element 14.

The third, fourth and fifth sealing elements 11, 14, 15 are optional for the sealing arrangement 1 and can be used in any desired combination depending on requirements and application.

Figure 4:
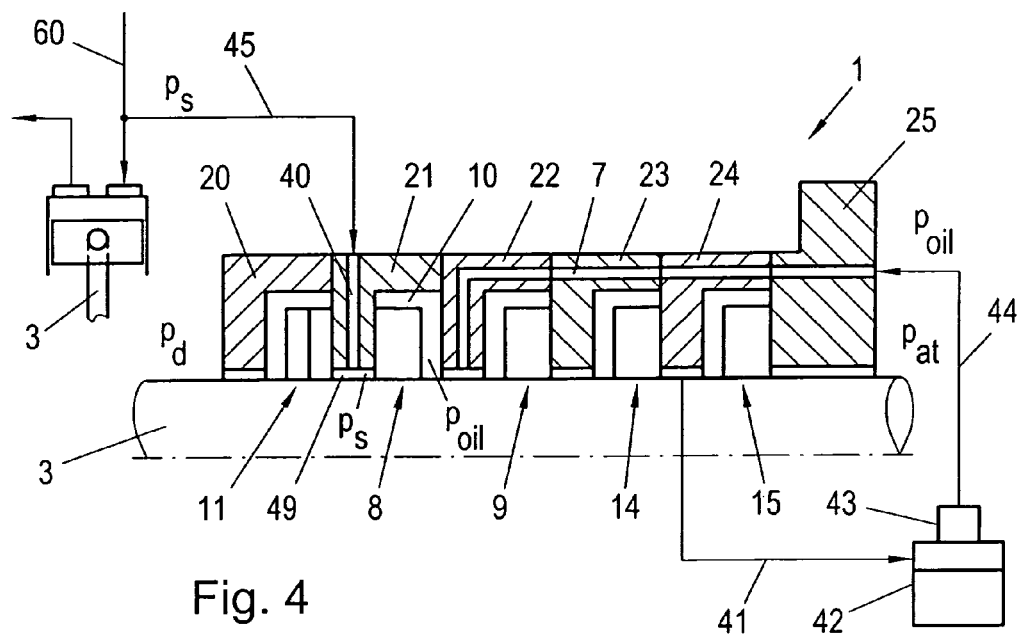
Figure 5:
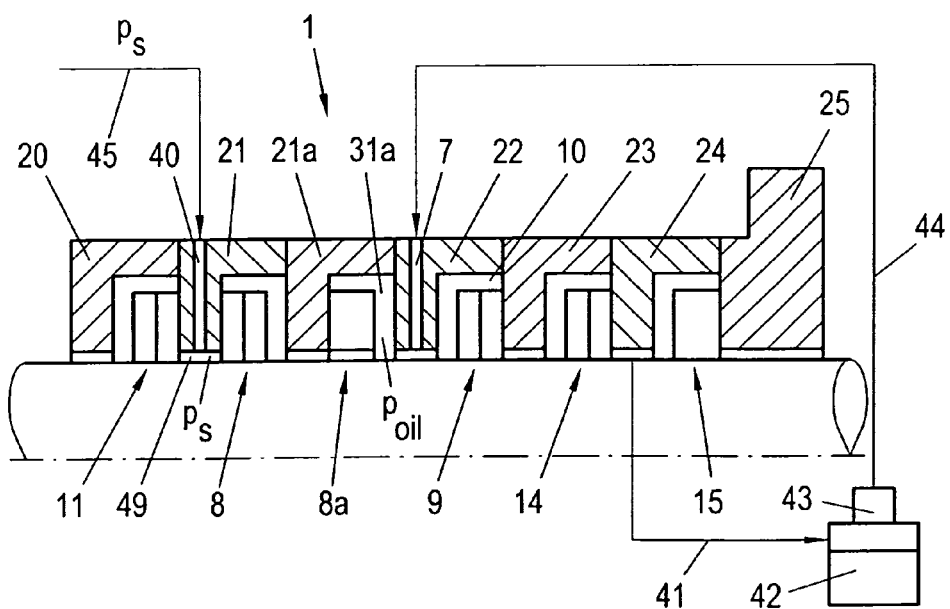
Figure 6:
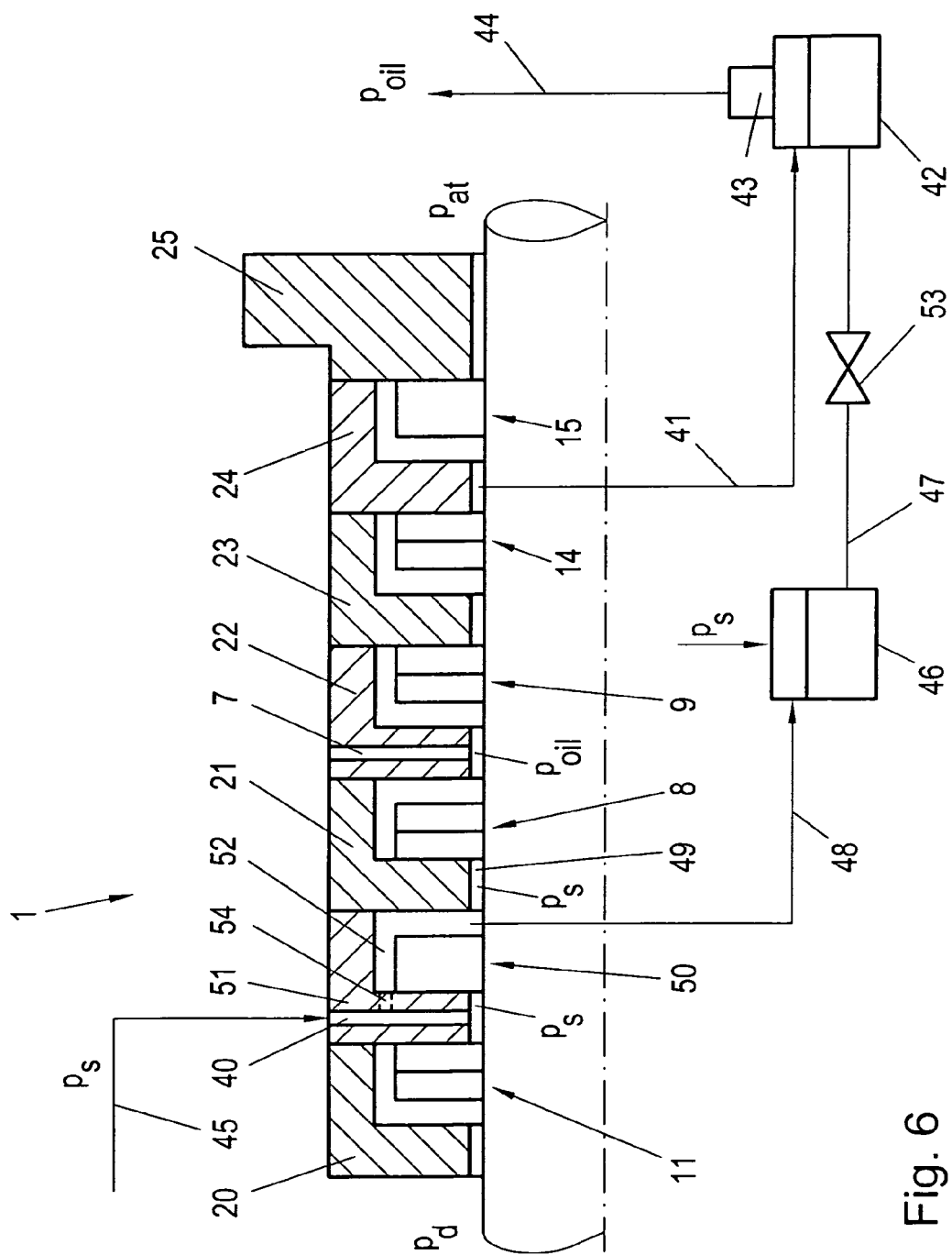

A further improvement of the invention is depicted in FIGS. 4 to 6. In these embodiments the pressure on the cylinder side before the first sealing element 8 is held to the suction pressure $p_S$ of the compressor. This has the advantage that the first and second sealing elements 8, 9 only have to provide sealing action against the (low) static suction pressure $p_S$. The (high) dynamic cylinder pressure $p_d$-$p_S$ is reduced by a sealing element 11 located before it. The necessary pressure $p_{oil}$ of the sealing medium can therefore be lowered accordingly. Consequently, a lower pressure difference is also active on the individual sealing elements 8, 9, which is why the requirements with regard to the sealing elements 8, 9 can be reduced. For example, for compressor applications, typically 8,000 operating hours without failure are required for the sealing arrangement 1. Due to the high relative speeds between the sealing elements 8, 9 and piston rod 3 and the possible high pressure differences for which sealing action must be supplied, in certain applications, for example, hydraulic sealing rings are unsuitable as sealing elements 8, 9 because they would not achieve the required operating life at such operational conditions. But by lowering the pressure difference for which sealing action must be provided by the measure as described above, these requirements placed upon the sealing elements 8, 9 are lowered, which is why hydraulic sealing rings can be used as well.

As shown in FIG. 4, in one possible embodiment of the sealing arrangement 1 the first and the second sealing elements 8, 9 are constituted by two hydraulic sealing rings, as described regarding FIG. 1. A third sealing element 11 is arranged on the cylinder side before and at an axial distance relative to the first sealing element 8, here as a packing ring combination. But the third sealing element 11 can also be implemented as a rigid or segmented packing ring or as a packing ring combination. Since the first sealing element 8 and the third sealing element 11 are arranged at an axial distance relative to each other, an intermediate space 49 is created between these sealing elements 8, 11, radially delimited here by the first chamber plate 21. Inside this intermediate space 49, the pressure is held to suction pressure $p_S$ by the feed line 40 in the first chamber plate 21, which is connected by a feed line 45 with the suction pressure $p_S$, for example the suction line 60 of the compressor. Therefore, the static suction pressure $p_S$ is in effect in the intermediate space 49 between the first sealing element 8 and the third sealing element 11. The sealing medium must therefore only provide sealing action against suction pressure $p_S$. The dynamic pressure difference $p_d - p_S$ is reduced by the third sealing element 11, here a packing ring combination, which is substantially less sensitive to pressure than a hydraulic sealing ring. With regard to the pressures, only $p_{oil} > p_S$ must therefore be met.

As described for FIG. 2 above, a fourth sealing element 14 in the form of a hydraulic sealing ring is envisioned for the side K of the crank case; a fifth element 1 is described, also as in FIG. 2 above, and envisioned in the form of a scraper ring. We refer to FIGS. 2 and 3 with regard to their functions. The forth sealing element 14 can also be omitted. The fifth sealing element 15 as well is not necessarily required, in particular if a hydraulic sealing ring with "return suction" is used as described previously. If present, the fifth sealing element 15 (scraper ring) removes the sealing medium that adheres to the piston rod 3, whereby substantially no sealing medium enters the crankcase. The gathered sealing medium is routed to a sealing medium reservoir 42 via a sealing medium line 41. From there, the sealing medium, while under pressure $p_{oil}$, is fed by way of a pump 43 via a feed line 44 to the feed line 7. Sealing medium that may have gotten lost inside the cylinder chamber, in particular, if a packing ring or a packing ring combination is used as first sealing element 8 must be refilled in regular intervals in the sealing medium reservoir.

The embodiment according to FIG. 5 uses packing ring combinations as first and second sealing elements 8, 9 instead of hydraulic sealing rings. This always means that a certain amount of sealing medium will leak in the cylinder space and in the crankcase because any such packing ring combinations are never completely leak-proof. Otherwise, a further sixth sealing element 8a, here for example a hydraulic sealing ring (but could also be a packing ring or packing ring combination) is provided between the first and the second sealing elements 8, 9 in the recess 31 a of a further sixth chamber plate 21a. This sixth sealing element 8a is installed with excess; meaning, at first it is in radial inside, non-sealing contact with the piston rod 3 and therefore initially not activated. But if the first sealing element 8 fails, the suction pressure $p_S$ suddenly acts upon one side of the sixth sealing element 8a and the sealing medium pressure $p_{oil}$ acts on the other side, and the sixth sealing element 8a can be configured in such a way that it is activated in this case and pressed in a sealing fashion by the pressure of the sealing medium $p_{oil}$ against the piston rod 3. The sixth sealing element 8a therefore serves to provide security and maintains the sealing action in the event that the first sealing element 8a fails. But such a sixth sealing element 8a could naturally also be used in the context of a sealing arrangement as shown in FIG. 2.

The embodiments according to FIGS. 4 and 5 may result in leakage of sealing medium into the cylinder chamber. To prevent any such leakage it is possible to provide a scraper ring also on the side of the cylinder, as demonstrated in FIG. 6. To this end, a seventh sealing element 50 in the form of a scraper ring is arranged in a further seventh chamber plate 51 between the first sealing element 8 and the third sealing element 11. The sealing medium that is removed from the piston rod 3 by the scraper ring is discharged via a discharge line 48 from the recess 52 that is constituted by the seventh chamber plate 51. The discharge line 48 opens here into a second sealing medium reservoir 46 that is maintained at suction pressure $p_S$, as hinted at in FIG. 6, in order to keep the intermediate space 49 at suction pressure $p_S$ and to thereby keep the scraper ring without differential pressure. The same can also be achieved by routing the suction pressure $p_S$ in the recess 52 of the seventh chamber plate 51, for example via a connection bore hole 54, that connects the feed line 40 with the recess 52, as indicated in FIG. 6 by the perforated line. The second sealing medium reservoir 46 can be connected via a throttle 53 and a connecting line 47 with the first sealing medium reservoir 42. The throttle 53 is necessary since the first sealing medium reservoir 42 is usually held at atmospheric pressure $p_{at}$, for example by venting, and the sealing medium would otherwise be able to flow freely into the first sealing medium reservoir 42. But such a scraper ring could also be used in the context of a sealing arrangement 1 as shown in FIG. 2. In this case, the scraper ring could be maintained without differential pressure by routing the pressure acting ahead of the scraper ring through corresponding connecting bore holes also into the recess that receives the scraper ring.

The embodiments of a sealing arrangement according to the invention 1 that have been described above are only exemplary and any combinations of the described sealing elements 8, 8a, 9, 11, 14, 15 and 50 are conceivable.

The invention claimed is:

1. A sealing assembly for sealing a reciprocating piston rod of a reciprocating compressor positioned radially inwardly thereof, said sealing assembly having a cylinder end and a crankcase end and comprising:
   a housing which defines a hollow interior that faces radially inwardly,
   first and second chamber plates positioned within said hollow interior and which define a first recess that faces radially inwardly,
   first and second sealing elements positioned within said first recess,
   a first fluid line connected to said first recess,
   a pump connected to said first fluid line for delivering sealing medium to said first recess at a pressure which is higher than a pressure at said cylinder end of said sealing assembly and biasing said respective first and second sealing elements to opposite axial ends of said first recess and moving said first and second sealing elements radially inwardly, a third chamber plate positioned in said hollow interior at said cylinder end of the sealing assembly, said third chamber plate defining a third recess facing radially inwardly, a third sealing element in said third recess, said third sealing element comprising at least one packing ring, a fourth chamber plate positioned in said hollow interior between said third chamber plate and said first chamber plate, said fourth chamber plate defining a fourth recess facing radially inwardly and an intermediate space between said fourth recess and said third recess, a scraper ring positioned in said fourth recess, a second fluid line which extends partially through said fourth chamber plate and connects to said intermediate space, and a connection bore which extends from said second fluid line to said fourth recess, the interconnected second fluid line and connection bore functioning to maintain the scraper ring in the fourth recess without differential pressure thereon when in use.

2. The sealing assembly according to claim 1, wherein said first and second chamber plates are each L-shaped and in axial contact with one another.

3. The sealing assembly according to claim 2, wherein the first and second L-shaped chamber plates are positioned in parallel so that a radial leg of the second L-shaped chamber plate is positioned between the first and second sealing elements.

4. The sealing assembly according to claim 3, wherein said first fluid line extends through said radial leg of said second L-shaped chamber plate.

5. The sealing assembly according to claim 1, wherein at least one of said first and second sealing elements comprises a rigid, segmented or cut packing ring.

6. The sealing assembly according to claim 1, wherein at least one of said first and second sealing elements comprises a hydraulic sealing ring.

7. The sealing assembly according to claim 6, wherein the hydraulic sealing ring is located in axial contact with a rigid L-shaped support ring, the rigid L-shaped support ring being located at a radial distance relative to radial ends of the first recess.

8. The sealing assembly according to claim 7, including an accessory sealing unit between the rigid L-shaped support ring and the hydraulic sealing ring.

9. The sealing assembly according to claim 1, including a fifth chamber plate positioned in said hollow interior between said second chamber plate and crankcase end of said assembly, said fifth chamber plate defining a fifth recess facing radially inwardly, and a fifth sealing element comprising a packing ring, a packing ring combination, or a hydraulic sealing ring in said fifth recess.

10. The sealing assembly according to claim 9, including a sixth chamber plate positioned in said hollow interior between said first and second chamber plates and defining a sixth recess facing radially inwardly, and a sixth sealing element comprising a second scraper ring in said sixth recess.

11. A sealing assembly for sealing a reciprocating piston rod of a reciprocating compressor positioned radially inwardly thereof, said sealing assembly having a cylinder end and a crankcase end and comprising:

a housing which defines a hollow interior that faces radially inwardly, first and second chamber plates positioned within said hollow interior and which define a first recess that faces radially inwardly, first and second sealing elements positioned within said first recess, a first fluid line connected to said first recess, a pump connected to said first fluid line for delivering sealing medium to said first recess at a pressure which is higher than a pressure at said cylinder end of said sealing assembly and biasing said respective first and second sealing elements to opposite axial ends of said first recess and moving said first and second sealing elements radially inwardly, a third chamber plate positioned in said hollow interior at said cylinder end of the sealing assembly, said third chamber plate defining a third recess facing radially inwardly, a third sealing element in said third recess, said third sealing element comprising at least one packing ring, a fourth chamber plate positioned in said hollow interior between said third chamber plate and said first chamber plate, said fourth chamber plate defining a fourth recess facing radially inwardly and an intermediate space between said fourth recess and said third recess, a scraper ring positioned in said fourth recess, a second fluid line extending to said intermediate space for delivering suction pressure (Ps) thereto, and a third fluid line connected to said fourth recess to drain sealing medium therefrom and maintain the scraper ring in the fourth recess without differential pressure when in use.

12. The sealing assembly according to claim 11, wherein said first and second chamber plates are each L-shaped and in axial contact with one another.

13. The sealing assembly according to claim 12, wherein the first and second L-shaped chamber plates are positioned in parallel so that a radial leg of the second L-shaped chamber plate is positioned between the first and second sealing elements.

14. The sealing assembly according to claim 13, wherein said first fluid line extends through said radial leg of said second L-shaped chamber plate.

15. The sealing assembly according to claim 11, wherein at least one of said first and second sealing elements comprises a rigid, segmented or cut packing ring.

16. The sealing assembly according to claim 11, wherein at least one of said first and second sealing elements comprises a hydraulic sealing ring.

17. The sealing assembly according to claim 16, wherein the hydraulic sealing ring is located in axial contact with a rigid L-shaped support ring, the rigid L-shaped support ring being located at a radial distance relative to radial ends of the first recess.

18. The sealing assembly according to claim 17, including an accessory sealing unit between the rigid L-shaped support ring and the hydraulic sealing ring.

19. The sealing assembly according to claim 11, including a fifth chamber plate positioned in said hollow interior between said second chamber plate and crankcase end of said assembly, said fifth chamber plate defining a fifth recess facing radially inwardly, and a fifth sealing element comprising a packing ring, a packing ring combination, or a hydraulic sealing ring in said fifth recess.

20. The sealing assembly according to claim 19, including a sixth chamber plate positioned in said hollow interior between said first and second chamber plates and defining a sixth recess facing radially inwardly, and a sixth sealing element comprising a second scraper ring in said sixth recess.

21. The sealing assembly according to claim 11, including a reservoir at suction pressure ($P_S$) to which said third fluid line is connected.

22. A sealing assembly for sealing a reciprocating piston rod of a reciprocating compressor positioned radially inwardly thereof, said sealing assembly having a cylinder end and a crankcase end and comprising:
- a housing which defines a hollow interior that faces radially inwardly,
- first and second chamber plates positioned within said hollow interior and which define a first recess that faces radially inwardly,
- first and second sealing elements positioned within said first recess,
- a first fluid line connected to said first recess,
- a pump connected to said first fluid line for delivering sealing medium to said first recess at a pressure which is higher than a pressure at said cylinder end of said sealing assembly and biasing said respective first and second sealing elements to opposite axial ends of said first recess and moving said first and second sealing elements radially inwardly,
- a third chamber plate positioned in said hollow interior at said cylinder end of the sealing assembly, said third chamber plate defining a third recess facing radially inwardly,
- a third sealing element in said third recess, said third sealing element comprising at least one packing ring,
- a fourth chamber plate positioned in said hollow interior between said third chamber plate and said first chamber plate, said fourth chamber plate defining a fourth recess facing radially inwardly and an intermediate space between said fourth recess and said third recess,
- a scraper ring positioned in said fourth recess,
- a second fluid line which extends through said fourth chamber plate to said intermediate space for connection to an external feed line to deliver suction pressure (Ps) to said intermediate space, and
- a connection bore which extends from said second fluid line to said fourth recess so as to deliver suction pressure (Ps) to said fourth recess and maintain the scraper ring in the fourth recess without differential pressure when in use.

23. The sealing assembly according to claim 22, wherein said first and second chamber plates are each L-shaped and in axial contact with one another.

24. The sealing assembly according to claim 23, wherein the first and second L-shaped chamber plates are positioned in parallel so that a radial leg of the second L-shaped chamber plate is positioned between the first and second sealing elements.

25. The sealing assembly according to claim 24, wherein said first fluid line extends through said radial leg of said second L-shaped chamber plate.

26. The sealing assembly according to claim 22, wherein at least one of said first and second sealing elements comprises a rigid, segmented or cut packing ring.

27. The sealing assembly according to claim 22, wherein at least one of said first and second sealing elements comprises a hydraulic sealing ring.

28. The sealing assembly according to claim 27, wherein the hydraulic sealing ring is located in axial contact with a rigid L-shaped support ring, the rigid L-shaped support ring being located at a radial distance relative to radial ends of the first recess.

29. The sealing assembly according to claim 28, including an accessory sealing unit between the rigid L-shaped support ring and the hydraulic sealing ring.

30. The sealing assembly according to claim 22, including a fifth chamber plate positioned in said hollow interior between said second chamber plate and crankcase end of said assembly, said fifth chamber plate defining a fifth recess facing radially inwardly, and a fifth sealing element comprising a packing ring, a packing ring combination, or a hydraulic sealing ring in said fifth recess.

31. The sealing assembly according to claim 30, including a sixth chamber plate positioned in said hollow interior between said first and second chamber plates and defining a sixth recess facing radially inwardly, and a sixth sealing element comprising a second scraper ring in said sixth recess.

* * * * *